Patented Apr. 24, 1928.

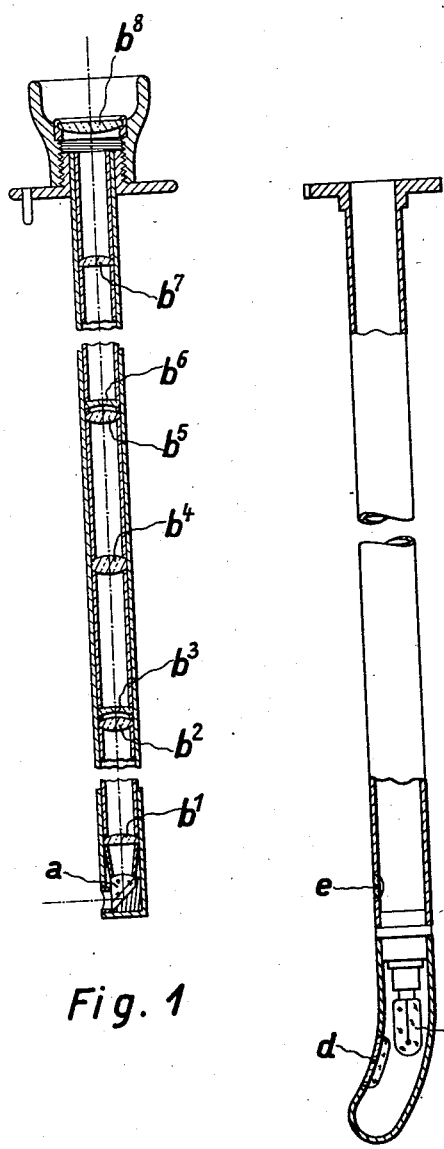

1,667,630

UNITED STATES PATENT OFFICE.

GÜNTHER LOECK, OF BERLIN, GERMANY, ASSIGNOR TO THE FIRM: GEORG WOLF G. M. B. H., OF BERLIN, GERMANY.

OPTICAL TUBE FOR CYSTOSCOPES, GASTROSCOPES, AND THE LIKE.

Application filed March 17, 1927, Serial No. 176,250, and in Germany March 20, 1926.

The optical tubes for cystoscopes, gastroscopes and the like, unless they are to be too imperfect, contain achromatically corrected lens systems consisting of several members, which latter, as is well known, are usually cemented with each other. The optical tubes of such instruments hitherto used have the drawback that they have to be sterilized in a comparatively complicated manner, viz, by wiping them off, immersing them into a disinfecting solution and the like, whereby great care must be taken in order to attain the desired effect. Although the usual construction of the tubes referred to has been repeatedly modified in order to be able to sterilize the tubes in a simpler and better way, viz, by boiling them, the effect strived for has hitherto not yet been attained, so that the aforesaid more complicated way of sterilizing is still adhered to.

According to the invention the boiling may yet be achieved by avoiding any cement to be used in the lens systems serving for eliminating the chromatic aberration, and constructing these systems as uncemented ones. For cementing the glass parts into the metal tube receiving the optical parts, as, e. g. the closing glass for the light entrance-aperture in the outer tube or the light entrance-prism one suitably uses a cement, which is not liable to be attacked by hot water, e. g. the so-called tooth cement, cement as used in dental surgery.

The annexed drawing shows as an example two tubes according to the present invention. Fig. 1 shows the optical inner tube of a cystoscope and Fig. 2 the appertaining outer tube. Both tubes are represented in a longitudinal section.

The inner tube contains a ridge prism $a$, provided with a spherically ground part and fixed with tooth cement, as well as a plurality of lenses $b^1$, $b^2$ . . . $b^8$. All lenses are fixed separately by means of tubes inserted into the inner tube. Four of these lenses, viz, $b^2$, $b^3$, $b^5$ and $b^6$ are united in two corresponding systems with a view to eliminating the chromatic aberrations in the optical system. The single members of these systems are also separated from each other by an air space.

The optical parts of the outer tube consist of a glow lamp $c$, a light exit-window $d$ and a light entrance-window $e$. Both windows are provided with closing glasses which are fixed in the tube by means of tooth cement.

I claim:

1. Optical tube for cystoscopes, gastroscopes and the like, containing optical parts adapted to present to the observer an image of the part of the body to be examined, which optical parts comprise lens systems composed of a plurality of lenses, the single members of these systems consisting of different kinds of glass in order to achieve chromatic correction and not being cemented with each other, and means adapted to secure the optical parts in the tube in their position.

2. Optical tube for cystoscopes, gastroscopes and the like, containing optical parts adapted to present to the observer an image of the part of the body to be examined, which optical parts partly consist of lens systems composed of a plurality of lenses, the single members of these systems not being cemented with each other, some of these optical parts being fixed in the tube by means of cement, which is not liable to being attacked by hot water, and means adapted to secure the other optical parts in the tube in their position.

GÜNTHER LOECK.